US006886715B2

(12) United States Patent
Lennox

(10) Patent No.: US 6,886,715 B2
(45) Date of Patent: May 3, 2005

(54) VENDING SYSTEM FOR PET ITEMS AND METHOD

(76) Inventor: Carlotta D. Lennox, 7575 Frankford Rd. #411, Dallas, TX (US) 75252

( * ) Notice: Subject to any disclaimer, the term of this patent is extended or adjusted under 35 U.S.C. 154(b) by 4 days.

(21) Appl. No.: 10/394,037

(22) Filed: Mar. 21, 2003

(65) Prior Publication Data

US 2004/0182876 A1 Sep. 23, 2004

(51) Int. Cl.[7] ........................ B65G 59/00
(52) U.S. Cl. ........................ 221/92; 206/527
(58) Field of Search ........................ 221/7, 9, 13, 92, 221/124, 289; 206/527, 830

(56) References Cited

PUBLICATIONS

Web Pages from Tiny Talks Vending.com; Feb. 19, 2003, pp 1–2.*
Web Pages from K and K Vending; Feb. 19, 2003, p. 1.*
Web Page from Pet Food Institute, http://www.petfoodinstitute.org/, Apr. 6, 2001, p. 1.
Web Page from Pet Food Institute, http://www.petfoodinstitute.org/what_is_pfi.cfm, Apr. 6, 2001, p. 1.
Web Pages from TinyTalksVending.com, http://www.tinytalksvending.com/News/dogven/htm, Feb. 19, 2003, pp. 1–2.
Web Pages from http://www.antiquegumball.com/pet/puppy.htm, Feb. 11, 2003, pp. 1–2.
Web Pages from http://www.antiquegumball.com/pet/kitty.htm, Feb. 11, 2003, pp. 1–2.
Sam's Club Vending Catalog 2001–2002, Mar. 2001, pp. 1–48.
Web Page from PG News, http://www.post–gazette.com/regionstate/2000091venblight6.asp, Feb. 19, 2003, pp. 1–5.
Web Page from K&K Vending, http://www.kkvending.com/yuppypuppy.htm, Feb. 19, 2003, p. 1.

* cited by examiner

*Primary Examiner*—Kenneth Noland
(74) *Attorney, Agent, or Firm*—Grady K. Bergen

(57) ABSTRACT

A vending system is provided that includes a vending machine housing. At least two different pet-related items are offered for vending, with the at least two different pet-related items being housed within the vending housing. At least one of the two different pet-related offered items is a non-pet-food pet-related item. The vending system also includes a vended item display for displaying information regarding the offered items. An exchange medium receptor capable of receiving an exchange medium and a dispensing mechanism for dispensing a selected offered item is also provided. The dispensing mechanism is operable upon receipt of a selected exchange medium by the exchange medium receptor and is non-operable when the exchange medium receptor has not received the selected exchange medium, and wherein the selected item is accessible and removable from the housing upon dispensing by the dispensing mechanism.

20 Claims, 1 Drawing Sheet

VENDING SYSTEM FOR PET ITEMS AND METHOD

TECHNICAL FIELD

The invention relates to pets.

BACKGROUND

Pet owners or handlers may often accompany their pets on walks and the like in various environments and locations that are far removed or at an inconvenient distance from where pet supplies or items are typically kept. When the need for such pet supplies or items arises, the pet owner or handler may be at a loss so that the pet owner must either do without the needed pet item or interrupt or cut short their time at the location. This may interfere with both the quality and amount of time the handler may enjoy with their pet. And where clean up after a pet is necessary, lack of the appropriate supplies may result in the area being left in an unsanitary condition.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
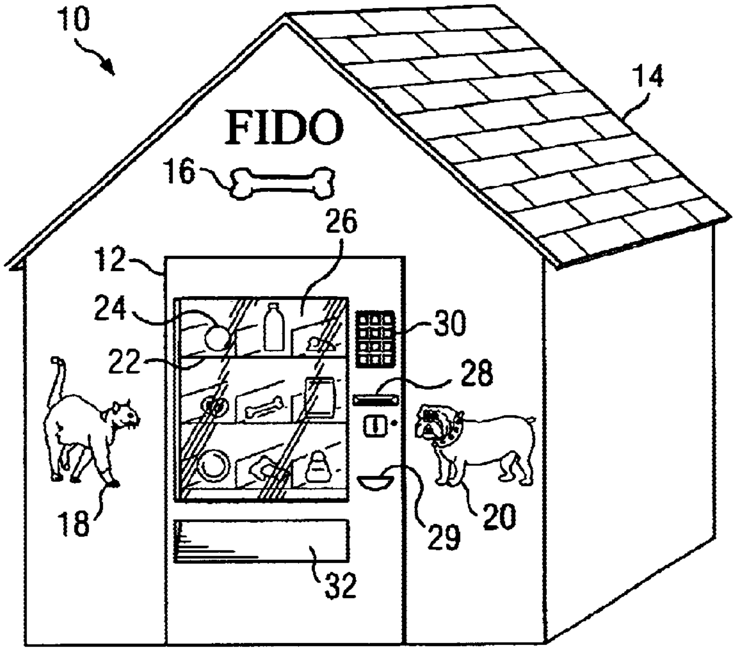
FIG. 1 is a front perspective view of a vending system for vending pet-related items.

Referring to FIG. 1, a vending system 10 for vending pet-related items is provided. The vending system 10 is provided with a vending machine housing body 12. An outer housing structure 14 having a pet-related configuration may be positioned over the body 12 or otherwise be incorporated with the vending machine housing body 12. In the embodiment shown, the structure 14 is configured to appear or have the likeness of a dog house. Pet-related indicia or signage 16, 18, 20 may also be provided on the housing body 12 or structure 14 to facilitate communicating the purpose or nature of the vending system 10.

The configuration of the vending system 10 may vary, but may be similar to those commonly used for the automatic or self-service vending of products, such as packaged snack products. In the embodiment shown, the vending system 10 is provided with one or more shelves 22 located within the housing body 12, wherein pet-related products or items 24 may be placed. The machine system 10 includes a transparent front cover 26 to allow visual perception of the products positioned or displayed within the housing 12 on the shelves 22, or is otherwise provided with signage or information regarding the products contained within the vending machine housing 12. Pricing information (not shown) for each of the items being offered for vending may also be provided.

The vending system 10 may be provided with an exchange medium receptor 28 for receiving currency, which may be in the form of coins or bills, or other exchange medium. A coin changer 29 may also be provided to allow change to be supplied to the user depending upon the value of the exchange medium being supplied and the value of the item being vended.

A control panel or product selector 30 is provided with the vending system 10. The product selector 30 allows one to select the desired offered product upon receipt of the necessary exchange medium by the receptor 28. The selector 30 may be of various forms and may be inoperable until the required medium of exchange has been received. In the embodiment shown, the selector 30 is in the form of an electronic keypad that allows a user to enter a selection instruction or code corresponding to the desired product being offered Upon selection of the desired item 24, a dispensing mechanism is provided for dispensing the selected item so that it is accessible and removable from the vending system 10. The dispensing mechanism may be inoperable until the required exchange medium has been received. In the embodiment shown, this may include a feeding or advancing mechanism (not shown), such as a helical-type conveyor, that advances items stored within the housing so that they are advanced or pushed off the forward edge of the shelf 22 and drop to a floor or drop box of the housing 12. A lower door or opening 32 in the housing may be provided for accessing and removing the dropped item from the floor. The door or opening 32 may be configured or located at a position wherein access or tampering with the offered items 24 stored on the shelves 22 is prevented. Other dispensing mechanisms may be employed as well.

Figure 2:
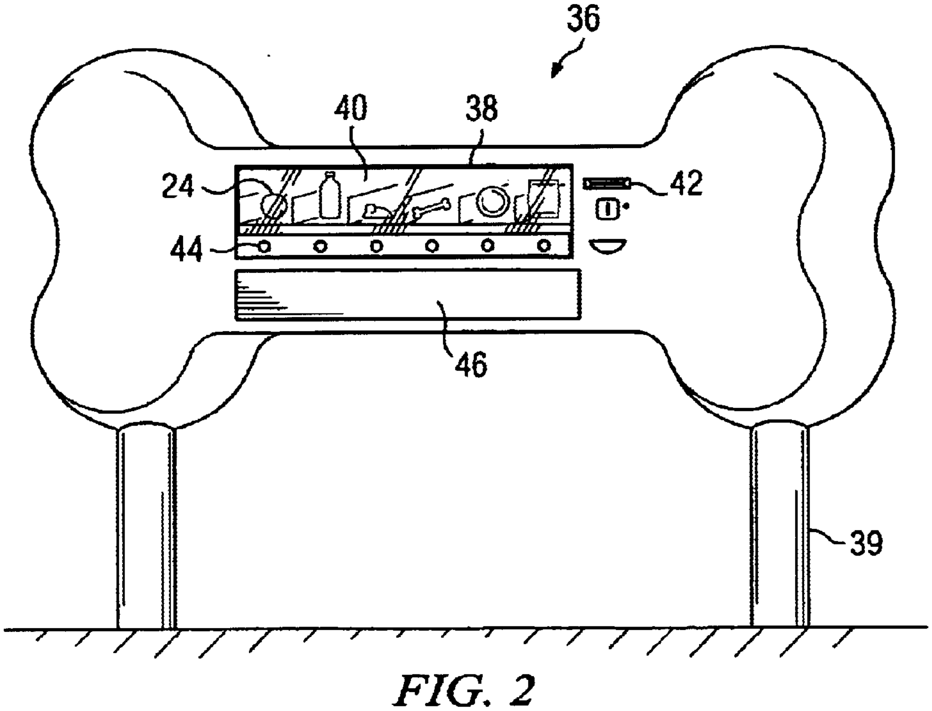
FIG. 2 is a front elevational view of another embodiment of a vending system for vending pet-related items.

FIG. 2 shows another embodiment of a vending system 36 for vending pet-related items. The system 36 includes a housing 38, which is configured as a dog bone, indicating the nature of the products being offered. The housing 38 is supported at an elevated position by legs or a base structure 39. Enclosed within the housing 38 are the pet-related products or items 24, which are stored therein. A transparent window or panel 40 allows visual perception of the items 24 stored within the housing 38. An exchange medium receptor 42 is provided with the vending machine for receiving coins, bills or other exchange medium. A plurality of selectors 44 are provided, each selector 44 corresponding to a particular item being offered.

Upon receipt of the necessary exchange medium, a user operates the selector 44 corresponding to the desired item 24. This causes the vended item to be dispensed to an access and retrieval area, indicated at 46, where the user may remove the item 24 from the vending unit 36. The selector 44 may be inoperable to cause dispensing of the selected item until the required exchange medium has been received by the receptor 42.

Each of the products or items 24 offered for vending is a pet-related item. These may include both pet-food items and non-pet-food items. Pet-food items may include pet food or snacks that may be stored in individual packages, and which may be of the same or different unit sizes or weights. Pet-food items may include treats, biscuits or cookies and edible chew items. Non-pet food items may include balls, such as tennis balls, foam or rubber balls. The non-pet food items may include non-ball toy items, such as squeak and non-squeak toys, non-edible chew items, flying discs or saucers, and retrieving articles.

A container or bottle of water or other drinking liquid for a pet may also be offered as one of the items 24. If not already configured, the container or bottle of water may be offered with a bowl or other container configured to facilitate access and drinking of the liquid therefrom by a pet. The bowl or container may also be offered separately from the container of water or drinking liquid. An example of a suitable commercially available container is the FOLD-A-BOWL pet bowl, available from PETCO Animal Supplies, Inc., San Diego, Calif.

Other items 24 may include clean up or waste disposal items or kits, such as rubber gloves, clean-up bags and/or scoops. Pet health items may also be offered for vending. These may include such things as first aid kits, antibiotic or antiseptic ointments or solutions, eye-wash solutions, anti-itch sprays or solutions, insect repellants, flea and tick powders, sprays or other products, cleaning wipes or other cleaners, etc. Grooming products may also be offered for vending, such as combs and brushes, shampoos, washes or wipes, deodorants or colognes, breath fresheners, etc.

Leashes, collars, muzzles, I.D. tags or a combination of these, and whistles may also be included among the offered items 24.

The vending systems may be positioned at or near locations where pet handlers and their pets often frequent, but where they may be distant or far removed from where pet supplies or items are typically kept or stored. Such areas may include apartments or human housing complexes, parks, outdoor walkways or trails, roadside rest stops, kennels or animal housing facilities and animal care facilities.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A vending system comprising:

a vending machine housing;

at least two different pet-related items offered for vending, the at least two different pet-related items being housed within the housing, and wherein at least one of the two different pet-related offered items is a non-pet-food pet-related item;

a vended item display for displaying information regarding the offered items;

an exchange medium receptor capable of receiving an exchange medium; and a dispensing mechanism for dispensing a selected offered item, the dispensing mechanism being operable upon receipt of a selected exchange medium by the exchange medium receptor and being non-operable when the exchange medium receptor has not received the selected exchange medium, and wherein the selected item is accessible and removable from the housing upon dispensing by the dispensing mechanism; and wherein the offered items are selected from a group consisting of a ball, a container of water or drinking liquid, a pet-food item, a pet grooming product, a pet health product, a non-ball pet toy, a collar, a leash, an I.D. tag, a whistle and a waste disposal kit.

2. The vending system of claim 1, wherein:

only pet-related items are offered for vending.

3. The vending system of claim 1, wherein:

the vending machine housing is provided with pet-related indicia.

4. The vending system of claim 1, wherein:

only pet-related items are offered for vending; and at least three different pet-related items are offered for vending.

5. The vending system of claim 1, wherein:

the vending system is positioned at or near at least one of an apartment or human housing complex, a park, a walkway or trail, a roadside rest stop, a kennel or animal housing facility, and an animal care facility.

6. The vending system of claim 1, wherein:

the vending machine housing is configured to appear as a pet-related structure.

7. A vending system comprising:

a vending machine housing configured to appear as a pet-related structure;

at least three different pet-related items offered for vending, the offered items being selected from a group consisting of a ball, a container of water or drinking liquid, a pet-food item, a pet grooming item, a pet health item, a non-ball pet toy, a collar, a leash, an I.D. tag, a whistle and a waste disposal kit, the at least three different pet-related items being housed within the housing, and wherein at least one of the three different pet-related offered items is a non-pet-food item, and wherein only pet-related items are offered for vending;

a vended item display for displaying information regarding the offered items;

an exchange medium receptor capable of receiving an exchange medium; and a dispensing mechanism for dispensing a selected offered item, the dispensing mechanism being operable upon receipt of a selected exchange medium by the exchange medium receptor and being non-operable when the exchange medium receptor has not received the selected exchange medium, and wherein the selected item is accessible and removable from the housing upon dispensing by the dispensing mechanism; and wherein the vending system is positioned at or near at least one of an apartment or human housing complex, a park, a walkway or trail, a roadside rest stop, a kennel or animal housing facility, and an animal care facility.

8. A method of providing pet-related items comprising:

providing a vending machine having at least two different pet-related items offered for vending, the offered items being selected from a group consisting of a ball, a container of water or drinking liquid, a pet-food item, a pet grooming item, a pet health item, a non-ball pet toy, a collar, a leash, an I.D. tag, a whistle and a waste disposal kit, the at least two different pet-related items being housed within a housing of the vending machine, and wherein at least one of the two different pet-related offered items is a non-pet-food item; and dispensing a selected offered item from the vending machine upon receipt of a selected exchange medium by the vending machine; and wherein providing the vending machine includes providing the vending machine at or near at least one of an apartment or human housing complex, a park, a walkway or trail, a roadside rest stop, a kennel or animal housing facility, and an animal care facility.

9. The method of claim 8, wherein:

only pet-related items are offered for vending.

10. The method of claim 8, wherein:

the vending machine is provided with pet-related indicia.

11. The method of claim 8, wherein:

at least three different pet-related items are offered for vending.

12. The method of claim 8, wherein:

the vending machine is configured to appear as a pet-related structure.

13. A vending system comprising:

a vending machine housing;

at least two different pet-related items offered for vending, the at least two different pet-related items being housed within the housing, and wherein at least one of the two different pet-related offered items is a non-pet-food pet-related item;

a vended item display for displaying information regarding the offered items;

an exchange medium receptor capable of receiving an exchange medium; and a dispensing mechanism for dispensing a selected offered item, the dispensing mechanism being operable upon receipt of a selected exchange medium by the exchange medium receptor and being non-operable when the exchange medium receptor has not received the selected exchange medium, and wherein the selected item is accessible and removable from the housing upon dispensing by the dispensing mechanism; and wherein the vending system is positioned at or near at least one of an apartment or human housing complex, a park, a walkway or trail, a roadside rest stop, a kennel or animal housing facility, and an animal care facility.

14. The vending system of claim 13, wherein:

only pet-related items are offered for vending.

15. The vending system of claim 13, wherein:

the vending machine housing is provided with pet-related indicia.

16. The vending system of claim 13, wherein:

at least three different pet-related items are offered for vending.

17. A vending system comprising:

a vending machine housing;

at least two different pet-related items offered for vending, the at least two different pet-related items being housed within the housing, and wherein at least one of the two different pet-related offered items is a non-pet-food pet-related item;

a vended item display for displaying information regarding the offered items;

an exchange medium receptor capable of receiving an exchange medium; and a dispensing mechanism for dispensing a selected offered item, the dispensing mechanism being operable upon receipt of a selected exchange medium by the exchange medium receptor and being non-operable when the exchange medium receptor has not received the selected exchange medium, and wherein the selected item is accessible and removable from the housing upon dispensing by the dispensing mechanism; and wherein the vending machine housing is configured to appear as a pet-related structure.

18. The vending system of claim 17, wherein:

only pet-related items are offered for vending.

19. The vending system of claim 17, wherein:

at least three different pet-related items are offered for vending.

20. The vending system of claim 17, wherein:

the vending system is positioned at or near at least one of an apartment or human housing complex, a park, a walkway or trail, a roadside rest stop, a kennel or animal housing facility, and an animal care facility.

* * * * *

US006886715C1

(12) EX PARTE REEXAMINATION CERTIFICATE (8413th)

United States Patent
Lennox

(10) Number: US 6,886,715 C1
(45) Certificate Issued: Jul. 19, 2011

(54) VENDING SYSTEM FOR PET ITEMS AND METHOD

(75) Inventor: Carlotta D. Lennox, Dallas, TX (US)

(73) Assignee: Hey Buddy, LLC, Plano, TX (US)

Reexamination Request:
No. 90/010,353, Dec. 11, 2008

Reexamination Certificate for:
Patent No.: 6,886,715
Issued: May 3, 2005
Appl. No.: 10/394,037
Filed: Mar. 21, 2003

(51) Int. Cl.
*B65G 59/00* (2006.01)

(52) U.S. Cl. .......................................... 221/92; 206/527

(58) Field of Classification Search ........................ None
See application file for complete search history.

(56) References Cited

U.S. PATENT DOCUMENTS

| | | | | |
|---|---|---|---|---|
| D131,296 S | | 2/1942 | Davis | |
| 3,663,239 A | | 5/1972 | Rowe et al. | |
| D272,918 S | * | 3/1984 | Glaser | D20/1 |
| 6,059,142 A | * | 5/2000 | Wittern et al. | 221/1 |
| 6,082,580 A | | 7/2000 | Mueller et al. | |
| 2003/0026876 A1 | | 2/2003 | Albuja et al. | |

FOREIGN PATENT DOCUMENTS

KR 2001-0099337 A * 11/2001

OTHER PUBLICATIONS

Chowdhury, Wamiq, Confections to Bark About, NJBIZ, Aug. 11, 2003, pp. 1–3.

Chomp Inc. Pet Candy Makes Ideal Stocking Stocking Stuffers for Fido and Friends: Yip Yap Breath Freshening Mints and Sniffers Chewy Bites Make for Perfect Pet Gifts, Business Wire, Dec. 9, 2002, p. 1.

Valentine's Day Goes to the Dogs with Pet 'Candy'; Express True Love to Pooch with Yip Yap and . . . , Business Wire, Feb. 6, 2002, p. 1.

Chew on this . . . (Candy Wrapper), Candy Industry, Apr. 1, 2002, p. 1.

Cat mints. (Candy Product Update)., Confectioner, May 1, 2003, p.1.

Chomp's Pet Candy, Convenience Store News, Nov. 17, 2005, p. 1.

Brannigan, Debbie, Woman on Top, from webpage at www.capitalistchicks.com/?q=node 136, accessed Nov. 8, 2010., p. 1.

Orloski, Amie, Canine Candy for All Markets, Packaging World Magazine, Feb. 2003, pp. 1–3.

Kevin Sullivan, "I'll Have the Dried Squid and a Coke, and Hold the Chitchat—Tokyo Convenience Store Run Entirely by Robots Offers Cheaper Prices and Service Without a Smile," The Seattle Times, May 20, 1997.

Sharon Tetrault, "Bottom Line: Redefining the Doggie Bag," Los Angeles Times, Mar. 27, 1994.

"Chomp Pet 'Candy' Unleashed," cHoMp, iNc. Press Release, Feb. 20, 2002.

(Continued)

*Primary Examiner*—Jeffrey L. Gellner

(57) ABSTRACT

A vending system is provided that includes a vending machine housing. At least two different pet-related items are offered for vending, with the at least two different pet-related items being housed within the vending housing. At least one of the two different pet-related offered items is a non-pet-food pet-related item. The vending system also includes a vended item display for displaying information regarding the offered items. An exchange medium receptor capable of receiving an exchange medium and a dispensing mechanism for dispensing a selected offered item is also provided. The dispensing mechanism is operable upon receipt of a selected exchange medium by the exchange medium receptor and is non-operable when the exchange medium receptor has not received the selected exchange medium, and wherein the selected item is accessible and removable from the housing upon dispensing by the dispensing mechanism.

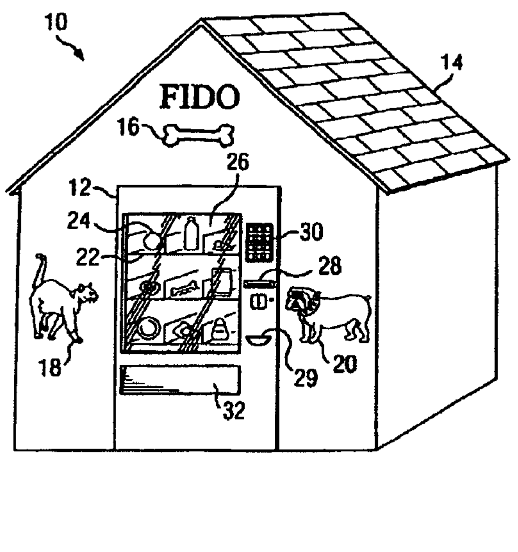

OTHER PUBLICATIONS

"Vending Machines Offer Chomp's Pet 'Candy' Alongside Candy for Humans," cHoMp, iNc. Press Release, Mar. 20, 2002.

"Chew on this . . . (Candy Wrapper), (Candy for dogs)," Candy Industry, Apr. 2002.

Nara Schoenberg, "Dog tiaras? Ferret conditioner? Entrepreneurs selling human–style products for Fifi," Chicago Tribune, Jun. 1, 2002.

Patricia Poist–Reilly, "Lititz, Pa. Dog Lover Turns Doggie–Treat Entrepreneur," Lancaster New Era, Aug. 26, 2002.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *